Dec. 4, 1951      A. E. NEUMANN      2,577,030
TRANSPARENT LUMINESCENT OBJECT
Filed Aug. 25, 1947
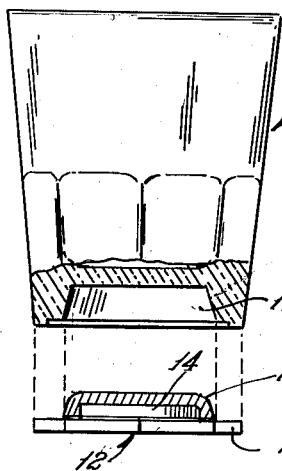
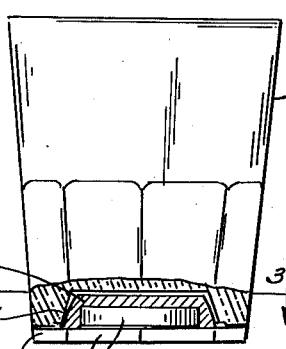
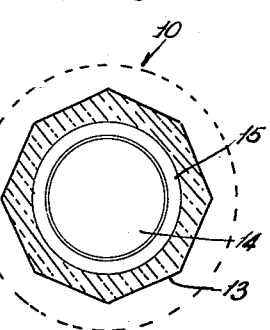
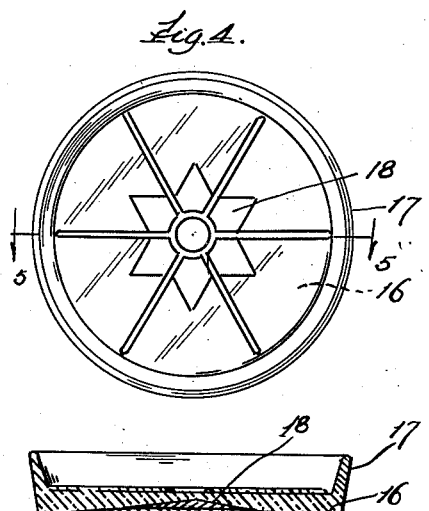
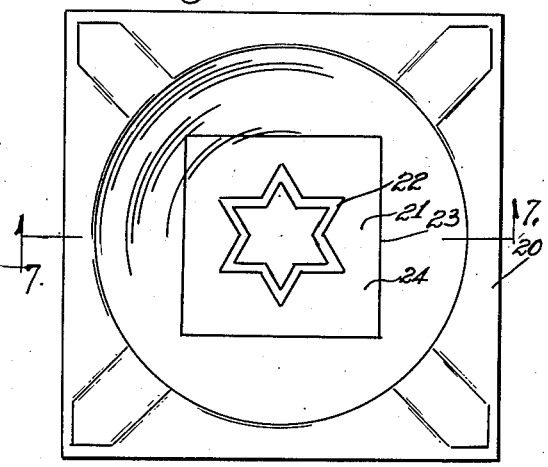
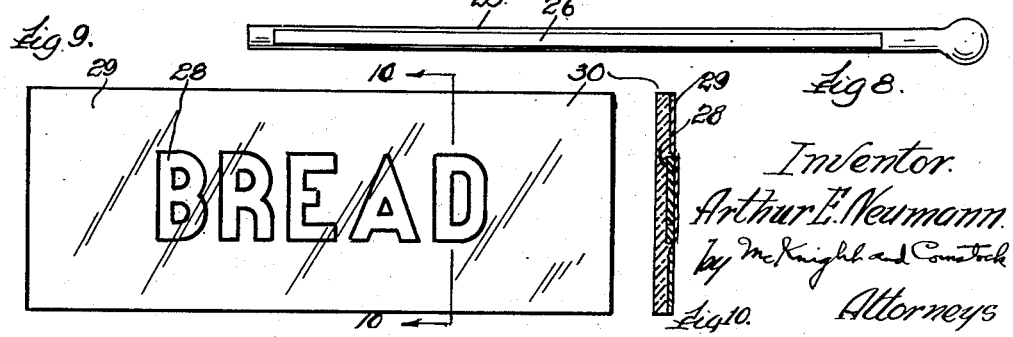
Inventor.
Arthur E. Neumann
by McKnight and Comstock
Attorneys Patented Dec. 4, 1951

2,577,030

UNITED STATES PATENT OFFICE 2,577,030

TRANSPARENT LUMINESCENT OBJECT

Arthur E. Neumann, Chicago, Ill.

Application August 25, 1947, Serial No. 770,516

2 Claims. (Cl. 250—71)

My invention relates to translucent and transparent objects having a luminescent portion.

Among the objects of my invention is to provide transparent and translucent objects such as drinking or serving glasses, glass ash trays, plastic stirring rods, plastic tubings, glass coasters, glass and plastic signs, and other transparent or translucent objects with luminescent portions, coatings or inserts, so that they will glow in the dark. Luminescent substances, regardless of whether they are dyed or pigmented with materials that fluoresce under activation by various bands of the electromagnetic spectrum, or with materials that phosphoresce after such activation, require protection from atmospheric oxidization and the destructive action of handling, washing, and ordinary wear; all of which tend to destroy their luminescence and contaminate or damage substances with which they are in contact. My luminescent portions are sealed into position so as to be free from outside contact. This prevents water, moisture, or other elements from reaching the luminescent portions and protects the contents of the transparent objects from being affected by the luminescent portions. Some of my objects may have color to contrast with or complement one or more colors of the luminescent portions.

Luminescent portions impart beautiful effects to glass and plastic articles, glowing with an inner light that creates an illusive light pattern throughout the glass or plastic article, often a light of a different color than that of the article itself. Their property of glowing in the dark makes them valuable as a means of locating the article at night, for convenience and as a safety device.

The luminescent materials are affixed to articles without danger of destructive action to the luminescent materials and without danger of contamination of food, drink, chemicals, metals, or other substances.

My invention also contemplates such other objects, advantages, and capabilities as will later more fully appear and which are inherently possessed by my invention.

While I have shown in the accompanying drawings, forms of my invention, yet I wish it understood that the same are susceptible of modification and change without departing from the spirit of my invention.

Referring to the drawings, Fig. 1 is a sectional exploded view of one embodiment of my invention; Fig. 2 is a sectional assembled view of the same embodiment and Fig. 3 is a sectional view on line 3—3 of Fig. 2; Fig. 4 is a top plan view of another embodiment of my invention and Fig. 5 is a sectional view on line 5—5 of Fig. 4; Fig. 6 is a top plan view of another embodiment of my invention and Fig. 7 is a sectional view on line 7—7 of Fig. 6; Fig. 8 is an elevational view of another embodiment of my invention; Fig. 9 is a face view of another embodiment of my invention and Fig. 10 is a sectional view on line 10—10 of Fig. 9.

An embodiment illustrative of my invention, as shown in Fig. 1, comprises a transparent drinking or serving glass 10, having a recessed bottom 11, within which is housed a luminescent member 12. This luminescent member 12 in one form consists of a white or light colored background or plaque 13 to the front surface of which is attached a disc 14 of smaller size, said disc being of luminescent material. The luminescent member 12 is attached to recessed bottom 11 by suitable sealing means, adhesives or the like. A transparent covering 15 may be placed over disc 14 as another seal to prevent any moisture, or water from reaching disc 14.

In another form of my invention, as shown in Fig. 4, the lower surface 16 of transparent glass coaster 17 has a coating 18 of luminescent material such as phosphorescent or fluorescent paint backed by another coating 19 of paint or other suitable material for sealing the coating 18. The coating 19, when larger in extent than area 18, is preferably white or light colored to also act as a reflector.

In another embodiment, as shown in Fig. 6, a transparent glass ash tray 20 has a lower surface 21 to which is attached a luminescent decalcomania 22, backed by a sealing plaque 23 having a luminescent face 24. Said plaque 23 is attached by a suitable adhesive to ash tray 20 and protects the luminescent portion from outside contact. I may employ, instead of plaque 23, a sealing coat of paint or other suitable sealing material. In the case of containers, such as drinking glasses, ash trays, vases, bottles, or any other container of utilitarian or artistic use, the luminescent material is affixed in recesses on the outer sides, top or bottom of the glass or plastic-ware, so that the container itself protects one side of the luminescent materials, while a laminated, cast, or painted coating of plastic material protects the outer side of the luminescent material, completely enclosing the luminescent material.

As shown in Fig. 8, my invention as applied to a stirring rod 25 discloses a luminescent core 26, sealed within the transparent plastic rod 25, which is molded or laminated therearound. The core 26 ends preferably short of the top end of the rod and also short of the bottom end of the rod, which is enlarged to simulate a ball, jewel, spoon, insigne, initial, or other desired design. My rod 25 may be of desired color or colors to contrast with or complement the color or colors imparted by the luminescent core 26. The core 26 may also include suitable inscriptions or markings for names advertising or the like. I may also use a plurality of luminescent cores of similar or different color, instead of a single core. My rod 26 may be curved to simulate letters or any desired shape and may be extended to form words, sentences or desired designs.

In the making of mixing rods, spoons, or other articles commonly inserted into liquids or finely divided solids, I employ the following method. A core of plastic material impregnated with luminescent dyes or pigments, or a core of any material coated with said dyes or pigments, is laminated, cast, or inserted within a translucent or transparent material so that the core is completely enclosed. This method is also used in making mouldings, light-switch plates, exit signs and other marking and locating devices, and in advertising displays.

Luminescent materials, particularly those that phosphoresce, depend to a great extent upon their bulk for the intensity and duration of their glow, and my method of using cores enables me to secure a more substantial concentration of luminescent materials than is possible by ordinary methods of printing, painting, or application by decalcomanias alone.

In another embodiment, I provide a decalcomania 28 of luminescent material. This is attached to the inner surface of a transparent glass or plastic member 30. This decalcomania 28 is backed by a second decalcomania 29 of luminescent material of color contrasting or complementing decalcomania 28, as shown in Figs. 9 and 10.

Luminescent decalcomanias now being manufactured lack intensity and duration of glow because by their nature they are only a thin film, whereas luminescent materials, particularly those that phosphoresce, depend largely on their bulk for the intensity and duration of their glow. The invention here, in reference to the above, is the application of double decalcomanias, the first of which carries its full quantity of luminescent material as well as the border and design that is designed, but has finished reflective or protective backing. The second decalcomania carries only the supplemental luminescent material in such positions or locations as will supplement the first decalcomania to double the amount of luminescent material. The second decalcomania carries the reflective or protective backing.

Luminescent decalcomanias now being manufactured are also unattractive because attempts to mix pigments or dyes of attractive colors with the luminescent dyes or pigments invariably result in diminution or extinction of the luminescence. The invention here is that the coloring dye is not mixed with the luminescent pigment or dye, but is applied in either the adhesive gum or the protective coating, depending on the side from which the decalcomania is to be viewed.

Still further variations of my invention may include the use of any of the foregoing features in such contrast as found desirable.

In use, my transparent objects, after or during exposure to natural or artificial rays of the visible or invisible range of the spectrum, will glow in the dark and provide beautiful colors. My serving and drinking glasses when used in a tavern or lounge, which is usually dark enough for perfect appreciation of luminescence will provide a light which appears to rise up the sides of the glass and fill the same with a rich and warm glow.

My other transparent objects are likewise attractive and interesting. The double decalcomanias have unusual eye appeal in attracting attention for advertising signs and the like, and have long and lasting memory value.

Having thus described my invention, I claim:

1. A luminescent transparent object comprising a drinking glass having a recessed bottom, a luminescent member having a plaque background with a light reflecting surface, a luminescent disc attached to the top surface of said background, a transparent covering extending over said disc and sealed to said background, said luminescent member positioned within said recessed bottom, and sealing means for sealing said luminescent member within said recessed bottom so that contents of the glass are not contaminated by contact with the luminescent member.

2. A luminescent drinking glass having an open top, transparent side walls and a closed bottom with an external recess, a luminescent outer plaque attached to the bottom of the glass and extending across and sealing said recess, a luminescent disc of smaller size than and attached to the upper surface of said plaque, and a transparent covering positioned over the top of said disc and said plaque to seal the same, said plaque and said disc adapted to provide light reflected by the transparent side walls of said glass and appearing to fill the same with a rich and warm glow, said plaque and said disc sealed from contact with the contents of the drinking glass.

ARTHUR E. NEUMANN.

REFERENCES CITED

The following references are of record in the file of this patent:

UNITED STATES PATENTS

| Number | Name | Date |
| --- | --- | --- |
| 1,201,322 | McCoach | Oct. 17, 1916 |
| 1,246,080 | Frank | Nov. 13, 1917 |
| 1,383,082 | Dodds | June 28, 1921 |
| 1,484,742 | Sherwin | Feb. 26, 1924 |
| 2,324,532 | Paul | July 20, 1943 |
| 2,360,516 | Schmidling | Oct. 17, 1944 |